Feb. 22, 1966 T. J. SWEENEY ETAL 3,235,929
FASTENER ASSEMBLY
Filed May 2, 1963 2 Sheets-Sheet 2
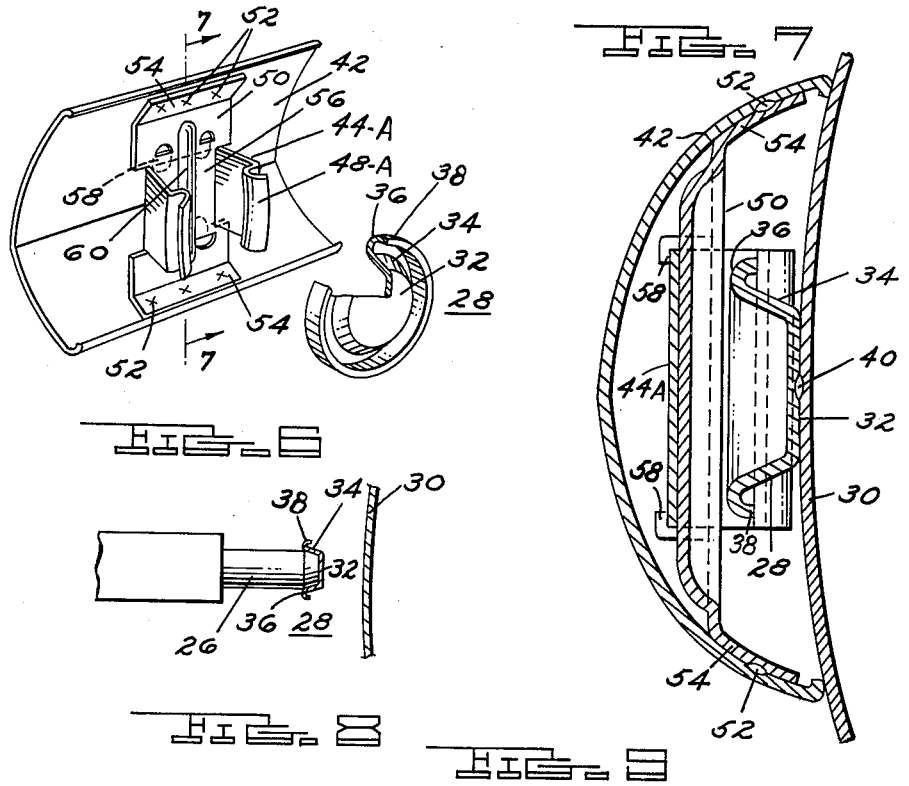
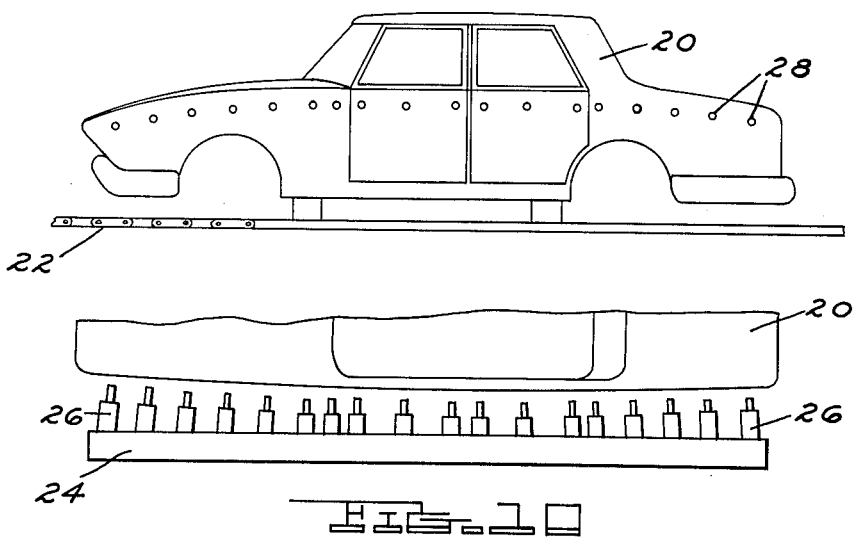
INVENTORS
THEODORE J. SWEENEY
CECIL FREDERICK ADICKES
BY HOMER C. LA GASSEY, JR.
Burton & Parker
ATTORNEYS United States Patent Office 3,235,929
Patented Feb. 22, 1966

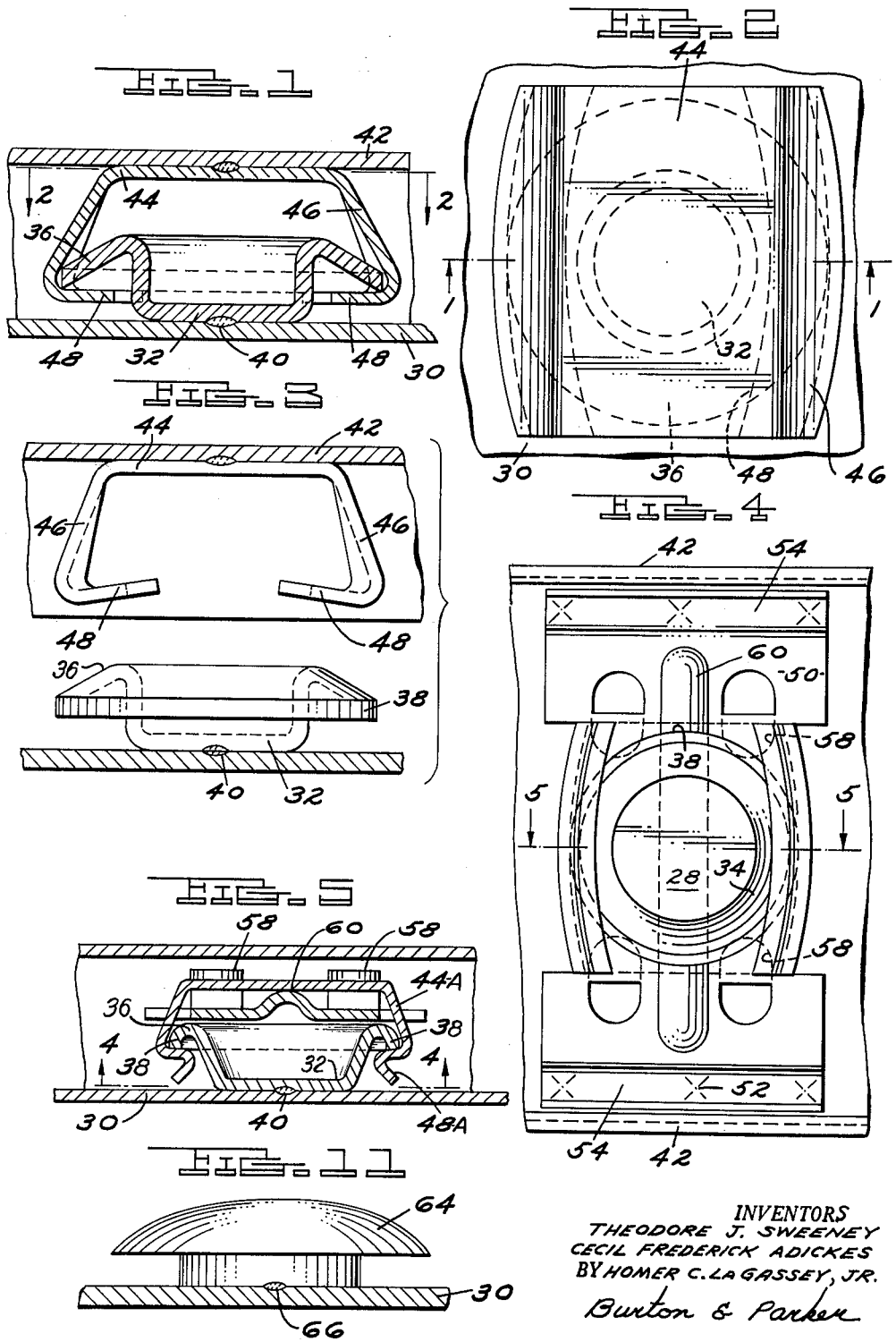

3,235,929
FASTENER ASSEMBLY
Theodore J. Sweeney, Grosse Pointe, Mich., Cecil Frederick Adickes, Woodland Hills, Calif., and Homer C. Lagassey, Jr., Royal Oak, Mich., assignors to Chicago United Products Company, Inc., Detroit, Mich., a corporation of Michigan
Filed May 2, 1963. Ser. No. 277,588
4 Claims. (Cl. 24—216)

This invention relates to an improved fastener assembly and to improved component parts thereof.

This invention constitutes a modification and development of the structure shown in U.S. Patent No. 3,153,468, entitled Panel Assembly Having a Trim Piece Attached Thereto Without Perforation of the Panel, inventor Theodore J. Sweeney, and the property of the assignee of this invention and application, Chicago United Products Co., Inc.

The patent hereinabove referred to concerned a method of and means for attaching a trim piece to an automobile body or to securing such a piece to a foundation structure, and to fastener means for effecting such securement.

This particular invention relates primarily to an improved fastener assembly and to improved interlocking fastener elements of a male and female fastener assembly and to component fastener elements so fashioned as to lend themselves to support in being welded to an automobile body side wall.

An object of the invention is the provision of relatively simple interlocking fastener elements adapted to be readily releasably secured together to fasten together the parts to which the two elements are secured.

Another object is the provision of fastener elements of the character specified, one of which, the male fastener element as here shown, is of such a construction that it may be readily removably received and mounted upon an electrode which is employed to weld such fasteneing element to a sheet metal panel or wall structure.

Another object is the provision of male and female fastener elements each of which is adapted to be welded or otherwise secured to a structural part, which two structural parts are designed to be fastened together by said fastener elements, and wherein one of said structural parts may be a metal automobile body panel wall and the other structural part may be a decorative trim piece or the like adapted to be secured to overlie a portion of said body wall, and wherein the fastener element that is secured to the body wall is of such a shape and character that it may be welded thereto quickly and easily prior to the finishing of the body wall and the surface of the wall thereafter finished with the fasteneing element attached thereto.

More specifically, the male fastener element is preferably of a hat shape having a crown and rim, and the crown portion of the hat is removably receivable over a welding electrode to be supported thereby and moved thereby into position with the top of the crown abutting the body wall for welding thereto. A fixture may be provided carrying a plurality of such electrodes and such plurality each carrying a fastener element, said elements adapted to be moved simultaneously into welding position against the exterior surface of the wall. The rim portion of the hat shaped fastener element is supported spaced above the side wall to which the crown portion is welded to serve as a head to be received within the female fastener element.

The interconnection of the fastener elements is such that there may be limited relative shiftability therebetween to facilitate such interengagement even though the alignment may not be perfectly accurate.

Another meritorious feature is that the female fastener element may comprise two interconnected pieces, namely, a base piece which may be welded to a trim strip or the like and a gripping piece carried by the base and having limited displacement with respect to the base and which gripping piece is adapted to grippingly engage the male fastener element when the male and female fastener elements are secured together.

Other objects and meritorious features of the invention will more particularly appear from the following description, claim, and accompaning drawings, wherein:

FIG. 1 is a cross sectional view taken on line 1–1 of FIG. 2 of an embodiment of the invention;

FIG. 2 is a cross sectional view taken on the line 2–2 of FIG. 1, looking toward the automobile body panel and showing the fastener assembly in plan;

FIG. 3 is a cross sectional view through a trim strip showing a female fastener such as is illustrated in FIG. 1 secured to the strip and in the normal position before being received over the male fastener as shown in FIG. 1; and also showing the male fastener with a margin 38 and secured to an automobile panel but spaced and separated from the female fastener;

FIG. 4 is a view taken on the line 4–4 of FIG. 5 showing a somewhat modified form of female fastener element as compared with that shown in FIGS. 1 through 3;

FIG. 5 is a cross sectional view taken on the line 5–5 of FIG. 4;

FIG. 6 is perspective of the assembly of FIGS. 4 and 5 showing the male and female fastener elements separated from each other and showing the male fastener broken away and showing the female fastener secured to a fragment of the underside of a trim strip;

FIG. 7 is a cross sectional view taken on the line 7–7 of FIG. 6 but showing the male and female fastener elements secured together and showing the fastener assembly in use holding a trim strip to a body wall;

FIG. 8 is a fragmentary section showing a fragment of an electrode upon which the male fastener element illustrated in FIG. 6 is supported in position to be moved up against a body wall panel for welding thereto;

FIG. 9 is a schematic illustration of an automobile body mounted upon a conveyor to travel therewith and showing schematically male fastener elements secured thereto;

FIG. 10 is a schematic illustration of a fixture having a multiplicity of electrodes adapted to receive male fastener element such as shown in FIG. 8 to be welded to the side wall of an automobile body which body is shown in fragmentary plan; and FIG. 11 is a side view of a male fastener, attached to a body wall and having a mushroom-shaped head adapted to receive the one of the female fasteners disclosed in FIGURES 1 to 7.

In the Patent No. 3,153,468 hereinabove referred to there are shown in FIGS. 1 and 2 views similar to FIGS. 9 and 10 herein illustrating the manner in which the male fastener elements of the fastener assemblies may be welded to the outer surface of an automobile body wall. Herein, in FIGS. 9 and 10, an automobile body is indicated as 20, conveyor mechanism as 22, and a welding fixture as 24 which is provided with a series of welding electrodes 26. These electrodes would be positioned on the fixture as desired to weld a plurality of male fastener elements to the outer surface of the body wall. An example of such an electrode 26 is shown in FIG. 8 with a male fastener element 28 supported thereupon to be projected against the outer surface of an automobile body side wall panel 30 to be welded thereto in a manner generally similar to that set forth in Patent No. 3,153,468.

This particular application shows a male fastener 28 which is preferably and in all FIGS. except FIG. 11, of a hat shaped contour as illustrated particularly in FIGS. 1, 3, and 6. The crown of the hat shaped male fastener is indicated as 32. The side wall which encircles the crown and slopes outwardly to a rim portion is indicated as 34. The rim portion 36 has an upturned margin 38, all as indicated in FIG. 6. This rim portion serves as the head of a male fastener element receivable within the female fastener element.

The crown portion of this hat shaped male fastener element serves as a shank to be welded to the body wall to support the head portion spaced thereabove to be received within or between the spring fingers of the female fastener element. The crown portion of this male fastener element is shaped to be readily removably received upon the tapered end of an electrode 26 as shown in FIG. 8, so that the top of the crown of the hat is adapted to be projected against the wall panel of an automobile body to be welded thereto as indicated at 40 in FIGS. 1 and 7. The several electrodes shown in FIG. 10 could each receive such a fastener element and by advancing the electrodes toward thhe automobile body wall the several fastener elements might be welded thereto at one operation. This provides a convenient and simple method of welding the male fasteners to the body side wall. Such male fasteners are shown welded to the body side wall in FIGS. 1, 5, 7, and 9.

In the several figures of the drawing this particular hat shaped male fastener element is shown as associated with a female fastener element which in FIGS. 1 and 3 is designed to be directly secured to the underside of a trim strip. Such trim strip is indicated as 42 in FIGS. 1, 3, 4, 6, and 7. In FIGS. 1 and 3 this female fastener element is somewhat U-shaped in cross section and is indicated as 44. The base of the U is shown in FIG. 1 as welded directly to the underside of the channel shaped trim strip 42. The U-shaped fastener element has opposed side wall portions 46 which have their margins bent inwardly toward each other as at 48, FIGS. 1 and 3.

The male fastener element is provided as hereinabove described with a crown portion 32 which is adapted to be welded to the side wall of an automobile body. This male fastener element has a marginal portion 38, FIGS. 1 and 3, over which the end portions 48 of the fingers of the U-shaped female fastener 44 are adapted to be sprung when the two fasteners are interengaged as shown in FIG. 1.

The female fasteners 44 shown in FIGS. 1, 2, and 3 differ slightly from the female fasteners 44–A shown in FIGS. 4, 5, and 6 but serve essentially the same purpose. The female fastener 44–A shown in FIG. 6 has a marginal portion 48–A which is folded over upon itself as shown in FIGS. 5 and 6. The corresponding female fastener 44 shown in FIGS. 1 and 3 has a marginal portion 48 of a generally similar design, but it is not folded over upon itself. Otherwise, it is of generally corresponding shape and serves the same purpose.

In the construction shown in FIGS. 1 and 3, the two prongs or fingers 46 of the U-shaped female fastener 44 are adapted to be sprung outwardly as such female fastener is moved downwardly over the sloping side walls or rim portion 36 of the male fastener 32. In FIGS. 1, 3, and 6, the margins of the prongs of the U-shaped female fastener element are slightly arcuate, as shown more particularly in FIG. 6, so as to more easily pass over the circular contour of the male fastener 28.

The male fastener 28 which is shown in FIGS. 6 and 8 differs slightly in detail from the male fastener which is shown in FIGS. 1 and 3 in that in FIGS. 6 and 8, the rim portion 36 of the hat shaped fastener shown in FIGS. 6 and 8 is folded over upon itself as there shown, to form the margin 28. In FIGS. 1 and 3 this rim portion is not shown as so folded over upon itself.

In FIGS. 1, 2, and 3, the female fastener element is welded directly to the underside of the trim strip 42 as hereinabove stated and as shown particularly in FIG. 1, and this female fastener element is a one piece U-shaped fastener element. In FIGS. 4, 5, 6, and 7, the female fastener element is a two piece assembly. It comprises a base 50 which is adapted to be welded as at 52 to the underside of the trim strip 42. This base has angular sides 54 shown particularly in FIGS. 6 and 7 which are the portions that are welded as at the points 52 to the trim strip. The base has a bridging section extending between these two side walls 54, and the intermediate portion of this bridging section which is indicated as 56 is of reduced width as shown in FIG. 6. The U-shaped fastener 44 is seated as a saddle over this intermediate bridging portion 56. In FIG. 6 this U-shaped fastener is indicated as 44–A to distinguish it from the fastener 44 in FIG. 1.

In FIG. 1 the fastener 44 has its base welded to the trim strip. In FIG. 6 the corresponding U-shaped fastener 44–A is loosely saddle seated over the intermediate portion 56 of the base. This base has tongues or detents 58 punched therefrom to overhang opposite sides of the base of the U-shaped fastener 44–A to hold the same to the base, all as shown in FIGS. 4 and 7. This base of the two piece female fastener has a rib 60 formed therein as shown in FIGS. 4, 5, and 6 upon which the base of the U-shaped fastener 44–A rests, as illustrated in FIGS. 4, 5, 6, and 7.

This two piece female fastener structure as described and shown in FIGS. 4, 5, 6, and 7, allows for a little lost motion adjustment of the female fastener element 44–A with respect to its base 50 and with respect to the male fastener 32 to enable slight juggling of the positions of the female fasteners with respect to the fixed positions of the male fasteners on the body for the attachment of the trim strip to the body.

In FIG. 11 is shown a male fastener which is mushroom shaped, having a head portion and a shank portion, but it is apparent that the female fastener elements could be cammed over the head portion in the same manner as they could be expanded to be received over the rim of the hat shaped male fastener element 32. The male fastener element, FIG. 11, is indicated as 64 and it might be welded to the body wall 30 as shown at 66. Such could not be suported upon the electrode 26 in the same manner as the male fastener 28, but it could be supported by a suitable electrode designed to receive the crown of the male fastener somewhat similar to the way in which the male fastener shown in FIG. 3 in Patent No. 3,153,468 is supported. It is apparent that while the modifications of the male and female fastener elements shown herein differ somewhat from each other, they are fundamentally similar, except that the two piece female fastener shown in FIGS. 4, 5, and 6 possesses advantages as to shiftability and capacity for self-adjustment to accommodate itself to a male fastener fixed upon the body side wall.

What we claim is:

1. A male and female fastener assembly comprising, in combination: a generally hat-shaped male fastener element having a hollow crown portion and a generally circular rim portion, said crown portion having a substantially planar outer surface secured to the surface of a panel without perforation of said panel, said rim portion spaced from the planar surface of said crown portion and extending radially from said crown portion and sloping at its distal end toward said panel, and a generally U-shaped female fastener element for receiving the rim portion of said male fastener element and having opposed hook-shaped spring fingers having camming surfaces adapted to ride said sloping rim portion of said male fastener element to spread apart and snap beneath the edge of the rim to secure said female fastener element to said rim portion in spaced relation with said panel.

2. A fastener assembly as defined in claim 1 wherein the spring fingers of said female fastener element are generally arcuately contoured to generally conform with the contour of the margin of the rim of said male fastener element.

3. In a male and female fastener assembly comprising, in combination, a male fastener element having a shank portion and a head portion, and a female fastener element comprising a base portion having opposite ends adapted to be secured to the underside of a structural part and having an intermediate bridging portion extending between said ends and supported thereby spaced from said part, and comprising a generally U-shaped gripping portion received saddlewise over the bridging intermediate portion of the base, with the two arms of said U-shaped gripping portion projecting away from the base and adapted to receive the head portion of the male fastener element.

4. A fastener assembly for securing a part to a panel without perforating the panel comprising: a circular generally hat-shaped male fastener element having a hollow crown portion, the outside of the top of which is adapted to be juxtaposed against and bonded to the panel without perforation of the panel, and the rim portion of which slopes angularly toward the panel terminating spaced therefrom to provide a sloping cam surface facing away from the panel, with an annular space between the rim and panel, and a female fastener element of generally U-shaped configuration and comprising opposed end fingers for interengagement with the male fastener element with the bight portion of the female fastener element disposed above the crown portion of the male fastener element and with the opposed end fingers overlying the rim portion thereof, the fingers of the U-shaped element being resilient and inturned at their distal ends to ride the cam surface of the rim portion to resistently expand during initial engagement of the two elements and to spring toward each other into said annular space between the rim portion and panel surface to resiliently anchor the elements together, and said female fastener element having a portion adapted to be secured to a part which is to be anchored on the panel with such part urged by the assembly toward the panel.

References Cited by the Examiner

UNITED STATES PATENTS

| | | | |
|---|---|---|---|
| 1,423,881 | 7/1922 | Rogers | 292—322 |
| 1,682,532 | 8/1928 | Maise. | |
| 1,751,239 | 3/1930 | Johnson | 24—216 |
| 2,097,988 | 11/1937 | Ross et al. | 24—216 X |
| 2,103,743 | 12/1937 | Doty | 85—32 X |
| 2,948,937 | 8/1960 | Rapata | 24—73 |
| 3,016,590 | 1/1962 | Shanok et al. | 24—73 |

WILLIAM FELDMAN, *Primary Examiner.*

DONLEY J. STOCKING, *Examiner.*